(12) United States Patent
Hayashi

(10) Patent No.: US 9,832,690 B2
(45) Date of Patent: Nov. 28, 2017

(54) MOBILE COMMUNICATION SYSTEM AND COMMUNICATION METHOD

(71) Applicant: Sadafuku Hayashi, Tokyo (JP)

(72) Inventor: Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 79 days.

(21) Appl. No.: 14/798,663

(22) Filed: Jul. 14, 2015

(65) Prior Publication Data

US 2015/0319654 A1 Nov. 5, 2015

Related U.S. Application Data

(63) Continuation of application No. 12/531,900, filed as application No. PCT/JP2008/055274 on Mar. 21, 2008, now abandoned.

(30) Foreign Application Priority Data

Mar. 22, 2007 (JP) ................................. 2007-074554

(51) Int. Cl.
*H04W 36/00* (2009.01)
*H04W 72/04* (2009.01)
(Continued)

(52) U.S. Cl.
CPC ......... *H04W 36/0072* (2013.01); *H04L 12/14* (2013.01); *H04L 12/1435* (2013.01);
(Continued)

(58) Field of Classification Search
CPC ... H04L 1/0009; H04L 1/0026; H04L 1/0007; H04L 47/36; H04L 1/0015; H04L 1/0003;
(Continued)

(56) References Cited

U.S. PATENT DOCUMENTS 6,400,951 B1 6/2002 Vaara
6,424,625 B1 * 7/2002 Larsson ................ H04L 1/1806
370/236

(Continued)

FOREIGN PATENT DOCUMENTS

CN 1745599 A 3/2006
CN 1839641 A 9/2006
(Continued)

OTHER PUBLICATIONS

International Search Report for PCT/JP2008/055274 dated Jul. 1, 2008.
(Continued)

*Primary Examiner* — Jung-Jen Liu

(57) ABSTRACT

A mobile communication system which can transfer information on the number of packets counted up until then by a base station of a mobile source, to a base station of a mobile target, even when a terminal performs a handover. UE moves to a Target eNode B, but a Source eNode B decides to perform a handover, and the Source eNode B includes information on the number of packets counted up until then in a Handover Request message to the Target eNode B, so as to notify the Target eNode B. After receiving a Handover Confirm message from the UE, the Target eNode B includes information on the number of packets received from the Source eNode B in a Handover Complete message transmitted to a CN Node, so as to notify the CN Node.

8 Claims, 10 Drawing Sheets

(51) Int. Cl.
*H04L 12/14* (2006.01)
*H04M 15/00* (2006.01)
*H04W 4/24* (2009.01)
*H04W 4/26* (2009.01)
*H04W 88/08* (2009.01)
*H04W 88/02* (2009.01)
*H04W 36/02* (2009.01)
*H04W 92/20* (2009.01)

(52) U.S. Cl.
CPC ....... *H04M 15/73* (2013.01); *H04M 15/8038* (2013.01); *H04W 4/24* (2013.01); *H04W 4/26* (2013.01); *H04W 36/0055* (2013.01); *H04W 72/042* (2013.01); *H04M 2215/204* (2013.01); *H04M 2215/7072* (2013.01); *H04M 2215/7442* (2013.01); *H04W 36/02* (2013.01); *H04W 88/02* (2013.01); *H04W 88/08* (2013.01); *H04W 92/20* (2013.01)

(58) Field of Classification Search
CPC ... H04L 12/14; H04L 12/1403; H04L 1/1867; H04W 52/20; H04W 72/005; H04W 4/24; H04W 36/0055; H04W 36/385; H04W 48/12; H04M 2215/204
See application file for complete search history.

(56) References Cited

U.S. PATENT DOCUMENTS

| | | | | |
|---|---|---|---|---|
| 6,473,399 | B1* | 10/2002 | Johansson | H04L 1/0002 370/229 |
| 6,590,905 | B1* | 7/2003 | Suumaki | H04L 29/06 370/466 |
| 6,611,547 | B1* | 8/2003 | Rauhala | H04W 36/02 370/331 |
| 7,016,321 | B1* | 3/2006 | Park | H04W 36/0066 370/230 |
| 2002/0119766 | A1 | 8/2002 | Bianconi et al. | |
| 2003/0223422 | A1* | 12/2003 | Igarashi | H04L 1/1642 370/390 |
| 2005/0197125 | A1* | 9/2005 | Kang | H04W 52/287 455/439 |
| 2005/0282548 | A1* | 12/2005 | Kim | H04W 36/0055 455/436 |
| 2008/0085712 | A1* | 4/2008 | Han | H04W 36/04 455/440 |
| 2008/0163309 | A1* | 7/2008 | Kauranen | H04L 12/14 725/62 |
| 2008/0167047 | A1* | 7/2008 | Abedi | H04W 36/18 455/442 |
| 2008/0254800 | A1* | 10/2008 | Chun | H04W 48/12 455/438 |
| 2009/0052330 | A1* | 2/2009 | Matsunaga | H04L 1/0019 370/242 |
| 2009/0327842 | A1* | 12/2009 | Liu | H04L 1/0057 714/776 |
| 2010/0056151 | A1* | 3/2010 | Veres | H04W 28/14 455/436 |

FOREIGN PATENT DOCUMENTS

| | | | |
|---|---|---|---|
| EP | 1341342 A1 * | 9/2003 | ............ H04L 12/14 |
| JP | 2001513265 A | 8/2001 | |
| JP | 2003283510 A | 10/2003 | |
| JP | 2007013463 A | 1/2007 | |

OTHER PUBLICATIONS

NEC, Traffic Volume Report, 3GPP TSG-RAN WG2 Meeting #57, R2.070670, Feb. 16, 2007.
Huawei, Data Volume Report function in SAE/LTE, 3GPP TSG RAN WG3 Meeting #56. R3-071091, May 11, 2007.
Korean Office Action for KR10-2009-7021956 dated Mar. 15, 2011.
Supplementary European Search Report for EP 08 73 8697 dated Feb. 15, 2012.
Chinese Office Action for CN Application No. 201210472744.4 dated Dec. 3, 2014 with English Translation.
KR Office Action for KR Application No. 10-2014-7032699 dated Mar. 12, 2015 with English Translation.
3rd Generation Partnership Project, 3GPP TSG RAN WG3 Meeting #55 bis, "Data Volume Report procedure in SAE/LTE", Dated on Mar. 27-30, 2007, R3-070542, St. Julian Malta.
3rd Generation Partnership Project, "Data Volume Reporting Correction", 3GPP TS 25.413 V6.2.0 (Aug. 2004), R3-041177, 3GPP TSG RAN3 Meeting #43, Dated on Aug. 16-20, 2004, Prague, Czech Republik.

* cited by examiner

FIG. 3

| IE/Group Name | Presence | Range |
|---|---|---|
| RABs Data Volume Report List | O | |
| >RABs Data Volume Report Item IEs | | 1 to <maxnoofRABs> |
| >>RAB ID | M | |
| >>RAB Data Volume Report List | O | |
| >>>RAB Data Volume Report Item IEs | | 1 to <maxnoofVol> |
| >>>>Unsuccessfully Transmitted DL Data Volume | M | |
| >>>>Data Volume Reference | O | |

MOBILE COMMUNICATION SYSTEM AND COMMUNICATION METHOD

The present application is a divisional application of U.S. patent application Ser. No. 12/531,900 filed on Sep. 18, 2009, which is a National Stage Entry of international application PCT/JP2008/055274, filed Mar. 21, 2008, which claims the benefit of priority from Japanese Patent Application 2007-074554 filed on Mar. 22, 2008, the disclosures of all of which are incorporated in their entirety by reference herein.

FIELD OF THE INVENTION

The present invention relates to a mobile communication system and base station thereof, and in particular to information relating to the number of packets (namely, data volume) at handover in the mobile communication system.

BACKGROUND OF THE INVENTION

A mobile communication system in 3GPP (3rd Generation Partnership Project) LTE (Long Term Evolution) aims for an architecture as shown in FIG. 7. It is an object of this architecture to build a system that can realize shortening of transmission delay in a control plane and a user plane, and in which data transfer with higher throughput, for example, than existing systems can be realized.

An operator provides a service to a user in this system, and charges a fee; one charging method therefor that can be considered is to charge only for the number of packets that the user used.

In order to charge for the number of packets that the user used, it is necessary to count the number of packets that the user used. A method of doing this count is to count only the amount of packets that a network has successfully received, in an uplink case, and to count only the amount of packets that a user has successfully received, in a downlink case, and to charge for the number of counted uplink and downlink packets only.

With regard to counting the number of packets, since the number of packets successfully received is counted in the uplink case, normally CN (Core Network) Nodes of the network perform the count.

In the downlink case, packets transmitted by the network are not necessarily completely delivered to UE (User Equipment), due to radio wave state. For example, packet #1, packet #2, and packet #3 are transmitted from a network to the UE; packet #1 and packet #2 are successfully received by the UE, but packet #3 is not successfully received by the UE. In view of this type of situation, counting the amount of packets successfully received is considered at the UE. That is, counting is performed by a self-assessment of the UE.

However, if the UE performs the count, a case may be considered where, for example, a malicious UE or an altered UE reports to the network a number less than the actual number successfully received. In order to prevent this, the number of downlink packets is usually counted by the network. In this mechanism, for downlink packets transmitted from the network to the UE, a confirmation is made that a transmission confirmation (Acknowledge) from the UE has been received by the network, and the number of downlink packets is counted.

A function of this transmission confirmation is held by an entity called RLC (Radio Link Control) at an eNode B of the network, so that the number of successfully transmitted downlink packets is counted by the eNode B. This situation is shown in FIG. 9. Furthermore, "reporting the number counted to a CN Node", which reports to the CN Node, from the eNode B shown in FIG. 9, is normally performed when communication between the eNode B and the UE is ended and communication connection is cut.

On the other hand, in this LTE architecture, when an area covering one eNode B is small (for example, an urban area), there is a possibility that handover signals from the eNode B to the CN Node will increase enormously, due to UE movement between eNode Bs. In such a case, an excessive signal load is given to the CN.

In order to suppress handover signal load on the CN Node, exchanging of handover signals directly between a mobile source base station (Source eNode B) and a mobile target base station (Target eNode B) is devised. Furthermore, with a handover signal (Handover Request message of FIG. 8) received by the Target eNode B from the Source eNode B, if the handover is successful, that is, if confirmation of the Target eNode B establishing a communication connection with the UE is completed, the handover procedure is completed by the Target eNode B only transmitting one Handover Complete signal to the CN Node.

Here, the Handover Complete signal name is an example, and there are other names such as, for example, Path Switch, Binding Update, and the like, all of which have the same meaning.

The CN Node that receives this Handover Complete signal switches a UE directed path from the Source eNode B to the Target eNode B. In this way, it is possible to reduce the signal load and processing load due to handover at the CN Node.

In this handover method, information on the number of downlink packets counted before the mobile source eNode B performs handover, that is, "reporting the number counted to the CN Node" of FIG. 9 must be reported to the CN Node. Otherwise, the number of packets counted by the mobile source eNode B cannot be charged for.

In a conventional handover method (shown in FIG. 10), with a disconnect signal (Iu Release Command) from the CN Node as a trigger, the number counted by the mobile source eNode B is reported to the CN Node by the mobile source eNode B. Specifically, the Source eNode B reports the counting method to the CN Node by an Iu Release Complete message of FIG. 10.

Furthermore, even outside of the handover case, after ending of communication between the UE and the network, similarly to the above, with a disconnect signal (Iu Release Command) from the CN Node as a trigger, the eNode B reports the method of "reporting the number counted to the CN Node" to the CN Node by the Iu Release Complete message.

Technology related to the abovementioned mobile communication system is disclosed in the following patent documents.

[Patent Document 1]
  JP Patent Kokai Publication No. JP-P2003-283510A
[Patent Document 2]
  JP Patent Kokai Publication No. JP-P2007-013463A
[Patent Document 3]
  JP Patent Kohyo Publication No. JP-P2001-513285A

SUMMARY

The entire disclosure of Patent Documents 1 to 3 is incorporated herein by reference thereto. An analysis of related technology according to the present invention is given below.

With regard to this LTE handover method, since a disconnect signal from a CN Node to a Source eNode B does not exist, there is a problem in that the amount counted by the Source eNode B cannot be reported to the CN Node.

This problem causes a further problem in that, since the Source eNode B cannot report the number of packets successfully received before a UE handover to the CN Node, it is not possible to accurately charge for the number of packets successfully received before the UE handover.

Consequently, it is an object of the present invention to solve the abovementioned problems, and to provide a mobile communication system (and in particular, a base station therefor) in which information on the number of packets (that is, data volume) counted up to now at a base station of a mobile source can be transferred to a base station of a mobile target even when a terminal performs a handover.

A mobile communication system according to the present invention is a mobile communication system for transmitting downlink packets from a base station to a terminal, and includes the number of downlink packets in Data Volume Information from the base station.

That is, in the mobile communication system of the present invention, accompanying movement (handover) of a terminal (UE: user equipment) from an area of a mobile source base station (Source eNode B) to an area of a mobile target base station (Target eNode B), the mobile source base station transfers information on the number of packets communicated to the terminal before movement, to the mobile target base station, and the mobile target base station provides notification including information on the number of the packets in question in a message reporting handover completion (Handover Complete) to a CN Node (Core Network; or also referred to as EPC (Evolved Packet Core)).

Accompanying movement of the terminal from the area of the mobile source base station to the area of the mobile target base station, the mobile source base station provides, with regard to information on the number of packets communicated up until the terminal moves, notification including information on the number of the packets in question in a message (Release Resource Indication) reporting handover completion to the CN Node; and at a time of switching of the CN Node due to handover, provides notification of the number of packets of the UE stored by a switching source CN Node, to a switching target CN Node.

In this way, in the mobile communication system of the present invention, it is possible for information on the number of packets counted up until then by the eNode B to be transferred to the Target eNode B where the UE is moving to, even if the UE is undergoing handover between eNode Bs. That is, in the mobile communication system of the present invention, for example, after termination of UE communication, it becomes possible to accurately report the number of packets counted by the eNode B to the CN Node, and since the CN Node can report to a charging center, it becomes possible to have accurate charging.

Furthermore, in the mobile communication system of the present invention, even if the CN Node is switched due to a handover, by providing notification of information of the number of packets counted up until then from the switching source CN Node to a switching target, since it is possible to report information on the number of communicated packets of the UE to the charging center, it becomes possible to have accurate charging.

Various aspects of the invention are described below.

In a first aspect of the present invention, there is provided a base station for communicating with a wireless terminal.

The base station has transmission means for transmitting information related to data volume of downlink data to a second base station, when the wireless terminal performs a handover from the base station to the second base station. (Basic Mode 1)

In a second aspect of the present invention, there is provided a wireless communication system having a first base station, a second base station, and a wireless terminal. The wireless terminal performs handover from the first base station to the second base station; the first base station, when the handover is performed, transmits information related to the data volume of downlink data to the second base station; and the second base station receives the information related to the data volume.

In a third aspect of the present invention, there is provided a communication method of a base station with regard to a wireless terminal. That is, the method is characterized by including a process of the wireless terminal performing a handover from a base station to a second base station, and a process of transmitting information related to the data volume of the downlink data, when the handover is performed, to the second base station.

In a fourth aspect of the present invention, there is provided a communication method of a wireless communication system having a first base station, a second base station and a wireless terminal. That is, the method is characterized by including a process of the wireless terminal performing a handover from the first base station to the second base station, a process of the first base station transmitting information related to the data volume of the downlink data, when the handover is performed, to the second base station, and a process of the second base station receiving information related to the data volume.

In the present invention, by the abovementioned configuration and operation, an effect is obtained in which, even when a terminal performs a handover, it is possible for information on the number of packets counted up until then at a base station of a mobile source to be transferred to a base station of a mobile target.

BRIEF DESCRIPTION OF THE DRAWINGS

FIG. 3 is a drawing showing information (data volume report) of the number of packets reported in the first exemplary embodiment of the present invention.

PREFERRED MODES

As expanded embodiments of the present invention, configurations described in each dependent claim are specified. Downlink data is preferably data transmitted from a (first) base station to a wireless terminal. (Mode 2)

Downlink data is preferably data successfully transmitted from the (first) base station to the wireless terminal. (Mode 3)

Information related to data volume preferably includes time information on a time period in which the downlink data is transmitted. (Mode 4)

A transmission means preferably transmits information related to the data volume by a message requesting a handover. (Mode 5)

There is preferably a second transmission means for transmitting a message indicating completion of resource release from the (first) base station to a second base station, and the second transmission means preferably transmits information related to the data volume including the message indicating completion of resource release, before handover. (Mode 6)

After communication with the wireless terminal has been completed, the information related to the data volume is preferably transmitted to a core network in a message indicating completion of resource release. (Mode 7)

Information related to the data volume is preferably information on the number of downlink data packets. (Mode 8)

The second base station preferably transmits information related to the data volume by a message that completes handover to the core network. (Mode 9)

The first base station preferably includes and transmits to the second base station information related to the data volume in the message indicating the resource release. (Mode 10)

After communication between the first base station and the wireless terminal has been completed, information related to the data volume is preferably transmitted to the core network in a message indicating that the resource release is completed. (Mode 11)

The second base station preferably transmits information related to data volume by a message that reports handover completion to the core network. (Mode 12)

After transmission of a message requesting context information of a UE, to a first core network communicating with the first base station, from a second core network communicating with the second base station, the first core network preferably includes information related to data volume of uplink and downlink data summed up until then, in a message responding to the message requesting the context information of the UE, and transmits to the second core network. (Mode 13)

Next, a description of exemplary embodiments of the present invention is given making reference to the drawings. Exemplary Embodiment 1

Figure 1:
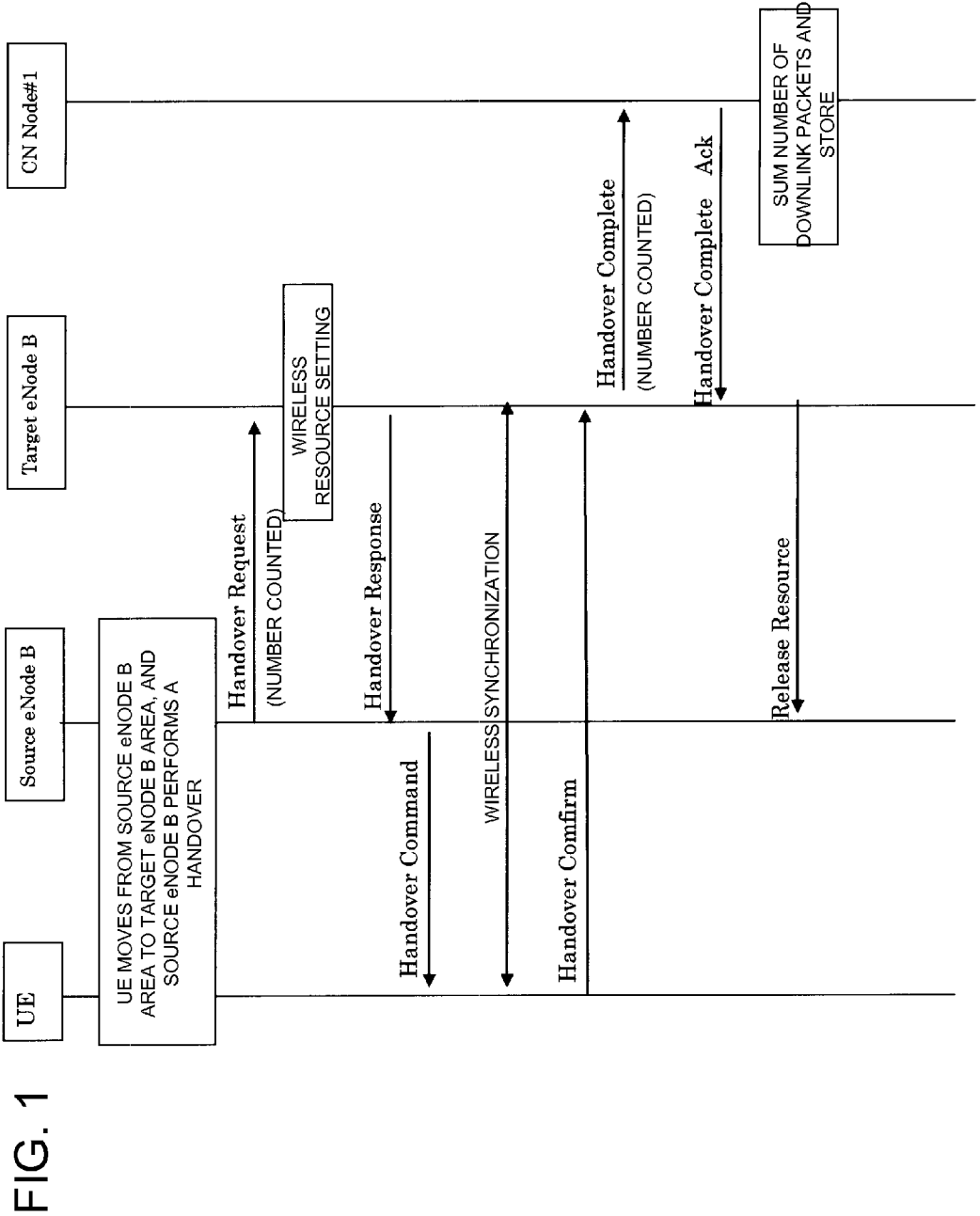
FIG. 1 is a sequence chart showing a handover procedure of a mobile communication system according to a first exemplary embodiment of the present invention.
Figure 2:
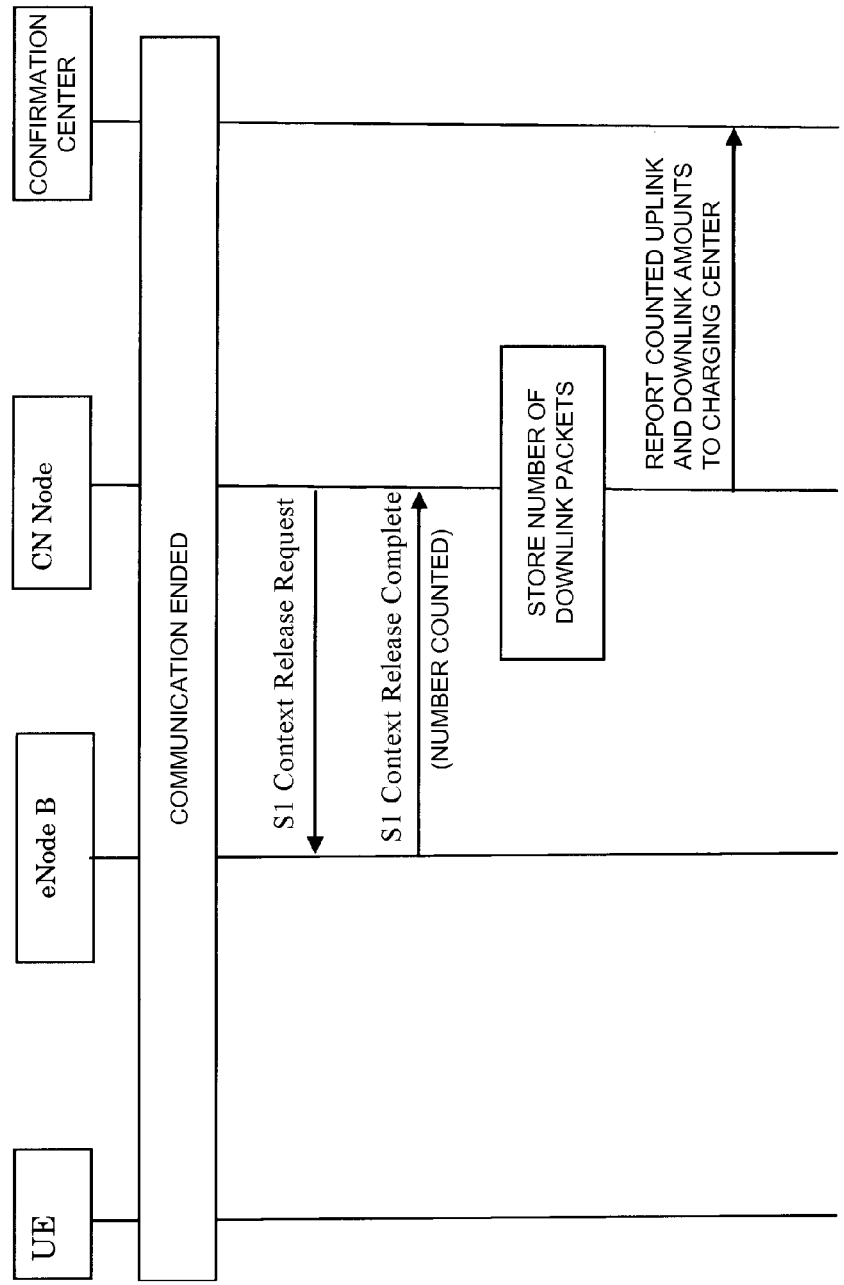
FIG. 2 is a sequence chart showing a procedure of reporting information counted according to the first exemplary embodiment of the present invention.

FIG. 1 is a sequence chart showing a handover procedure of a mobile communication system according to a first exemplary embodiment of the present invention; FIG. 2 is a sequence chart showing a procedure of reporting information counted according to the first exemplary embodiment of the invention; and FIG. 3 is a drawing showing information (data volume report) of the number of packets reported in the first exemplary embodiment of the present invention. Making reference to FIGS. 1 to 3, a description is given concerning operation of the mobile communication system according to the first exemplary embodiment of the present invention.

In the description below, the mobile communication system according to the first exemplary embodiment of the present invention is configured from the respective devices:

Source eNode B=mobile source base station

Target eNode B=mobile target base station

UE (User Equipment)=wireless terminal, also referred to simply as terminal, and

CN=Core Network, also referred to as ASGW (Access Gateway) or Access Anchor, but CN is a general term thereof, and there is no limitation thereto.

In FIG. 1, the UE is communicating with a Source eNode B. The UE moves to a Target eNode B, but the Source eNode B decides to perform a handover, and the Source eNode B includes information on the number of packets counted up until then (the number of packets received by the UE) in a Handover Request message to the Target eNode B, to notify the Target eNode B.

After the Target eNode B receives a Handover Confirm message from the UE, information on the number of packets counted, that has been received from the Source eNode B, is included in a Handover Complete message transmitted to the CN Node, and transmitted to the CN Node. Based on the information on the number of counted packets transmitted from the Target eNode B, the CN Node sums the number stored up until then, and stores this in memory.

This method can be described as in "The eNode B shall report to the CN in the Handover Complete message the data volume information if received from other eNode B during the handover procedure", or "The eNode B if has stored the data volume information from other eNode B, shall report to the CN in the Handover Complete message the data volume information".

Furthermore, timing of reporting the number of packets counted from the eNode B to the CN Node, as shown in FIG. 2, accompanying UE communication completion, for example, in order to release a resource to the eNode B, the CN Node transmits an S1 Context Release Request, and the eNode B replies to the CN Node with an S1 Context Release Complete message after completion of resource release, but with this S1 Context Release Complete message, a CN Node report may be performed, summing the number of packets counted that have been received from other eNodes B by the handover up until then and the number of self-counted packets.

The CN Node reports information (downlink) on the number of packets counted that have been received from the eNode B and information (uplink) on the number of self-counted packets to the charging center.

The information on the number of packets counted, transmitted from the Source eNode B, may be the number successfully transmitted to the UE, but may also be the number unsuccessfully transmitted to the UE. In a case where the information on the number of packets counted is taken as the information on the number unsuccessfully transmitted, for the CN Node the number successfully transmitted is the number of packets transmitted by the CN Node less the number unsuccessfully transmitted. This is expressed by a formula:

number of successfully transmitted packets=number of packets transmitted−number of packets unsuccessfully transmitted.

The information on the number of packets shown in FIG. 3 is Unsuccessfully Transmitted DL Data Volume, that is, number of packets unsuccessfully transmitted, but this may be Successfully Transmitted DL Data Volume, that is, the number successfully transmitted.

In this way, in the present exemplary embodiment, even with a handover of the UE between the Source eNode B and the Target eNode B, the information on the number of packets counted up until then by the Source eNode B can be transferred to the Target eNode B where the UE is moving to. In the present exemplary embodiment, for example, after termination of UE communication, it is possible to accurately report the number of packets counted by the eNode B to the CN Node, and since the CN Node can report to a charging center, it is possible to have accurate charging.

Exemplary Embodiment 2

Figure 4:
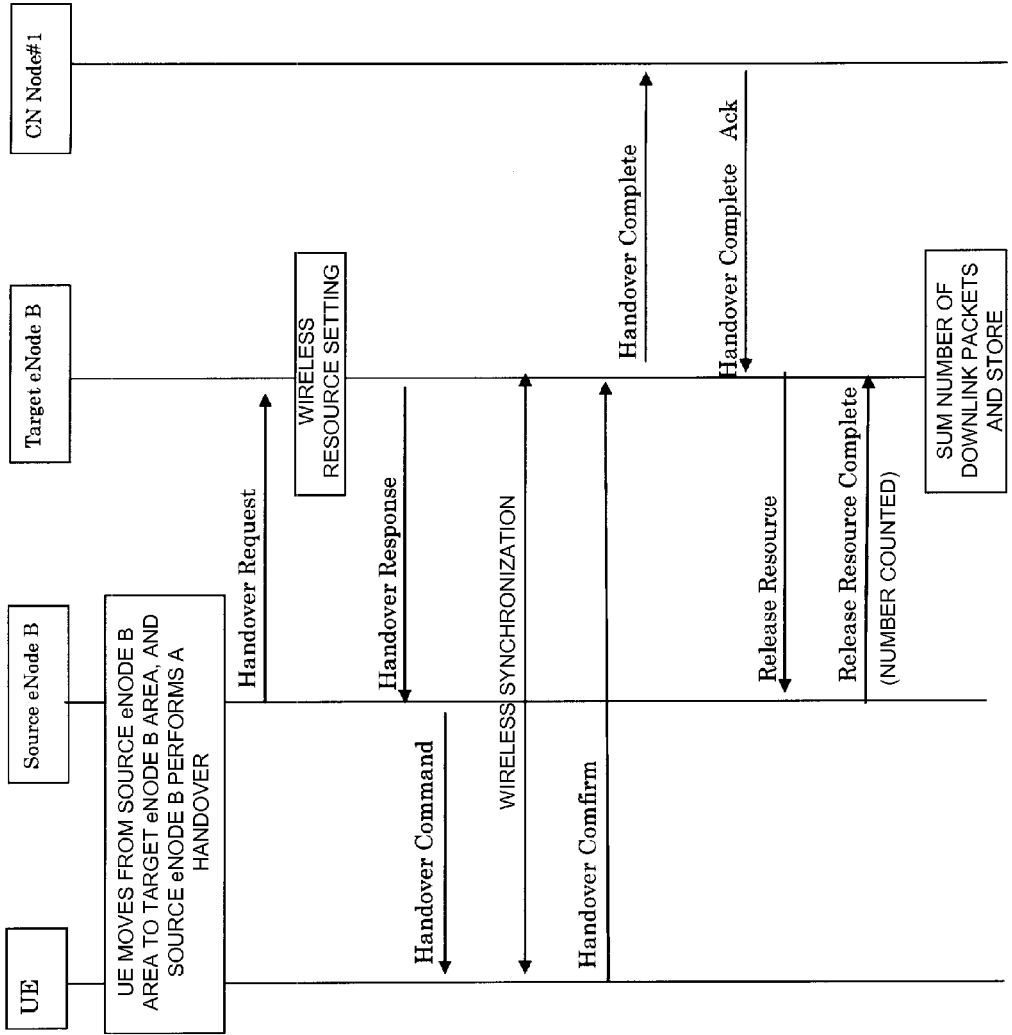
FIG. 4 is a sequence chart showing a handover procedure of a mobile communication system according to a second exemplary embodiment of the present invention.

FIG. 4 is a sequence chart showing a handover procedure of the mobile communication system according to a second exemplary embodiment of the present invention. With regard to FIG. 4, in the present exemplary embodiment, a Release Resource Complete message is provided from a Source eNode B to a Target eNode B, and information on the number of packets counted by the Source eNode B before handover is included in the Release Resource Complete message and transmitted.

In the present exemplary embodiment, for example, in a case where the handover procedure has been unsuccessful due to the Target eNode B failing to capture a resource or the like, it is possible to eliminate needless information transfer by a handover request message from the Source eNode B.

Furthermore, timing of reporting the number of packets counted from the eNode B to the CN Node, as shown in FIG. 2, for example, accompanying UE communication completion, in order to release a resource to the eNode B, the CN Node transmits an S1 Context Release Request message, and the eNode B replies to the CN Node with an S1 Context Release Complete message after completion of resource release, but with this S1 Context Release Complete message, a report is made to the CN Node, summing the number of packets counted that have been received from other eNodes B due to the handover up until then, and the number of self-counted packets.

The CN Node reports information (downlink) on the number of packets counted that have been received from the eNode B, and information (uplink) on the number of self-counted packets, to a charging center.

In this way, in the present exemplary embodiment, even with handover of the UE between the eNode Bs, the information on the number of packets counted up until then by an eNode B can be transferred to the CN Node, and since the CN Node can report to the charging center, it is possible to have accurate charging.

Exemplary Embodiment 3

Figure 5:
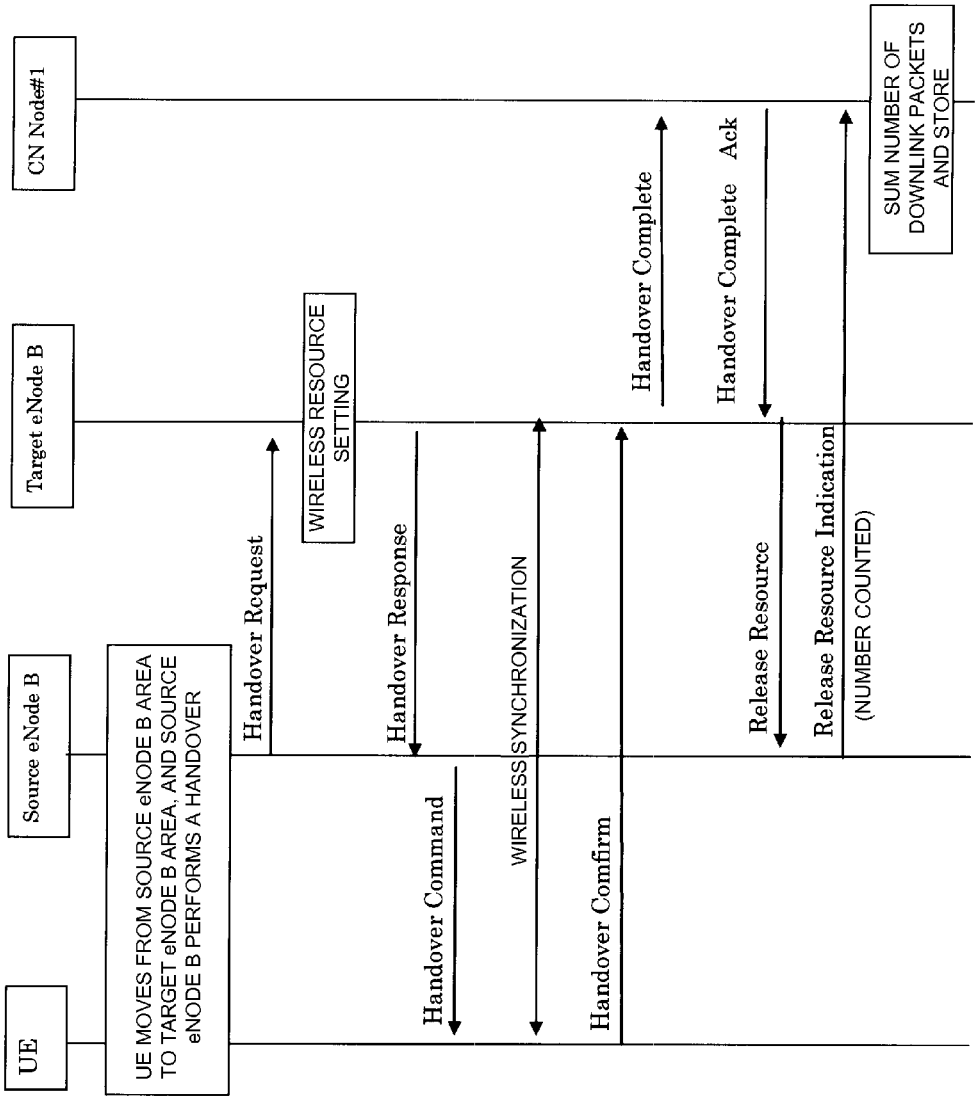
FIG. 5 is a sequence chart showing a procedure of reporting information counted according to a third exemplary embodiment of the present invention.

FIG. 5 is a sequence chart showing a procedure of reporting information counted according to a third exemplary embodiment of the present invention. Making reference to FIG. 5, a description is given of the procedure of reporting information counted according to the third exemplary embodiment of the present invention.

As shown in FIG. 5, after carrying out a handover, if a Source eNode B receives a Release Resource from a Target eNode B, information on the number of packets counted up until then is reported to a CN Node by a Release Resource Indication message, and information on the number of packets thus counted is summed with the number of packets counted by the CN Node up until then, and stored in memory.

Thereafter, the CN Node reporting to a charging center involves, for example, accompanying UE communication completion, in FIG. 2, reporting the number of packets counted, which have been received up until then by the CN Node, to the charging center.

In this way, in the present exemplary embodiment, even with the handover of the UE between the eNode Bs, the information on the number of packets counted up until then by an eNode B can be transferred to the CN Node, and since the CN Node can report to the charging center, it is possible to have accurate charging.

Exemplary Embodiment 4

In the mobile communication system, packet charging may be different according to time period. For example, a packet charge after 11 pm may be set to be cheaper than the charge before 11 pm. In order to deal with this, in the first exemplary embodiment of the present invention described above, it is possible to provide time period information in information on the number of packets counted that is notified by a Source eNode B to a Target eNode B. For example, time information may be provided in a Data Volume Reference of FIG. 3.

Exemplary Embodiment 5

Figure 6:
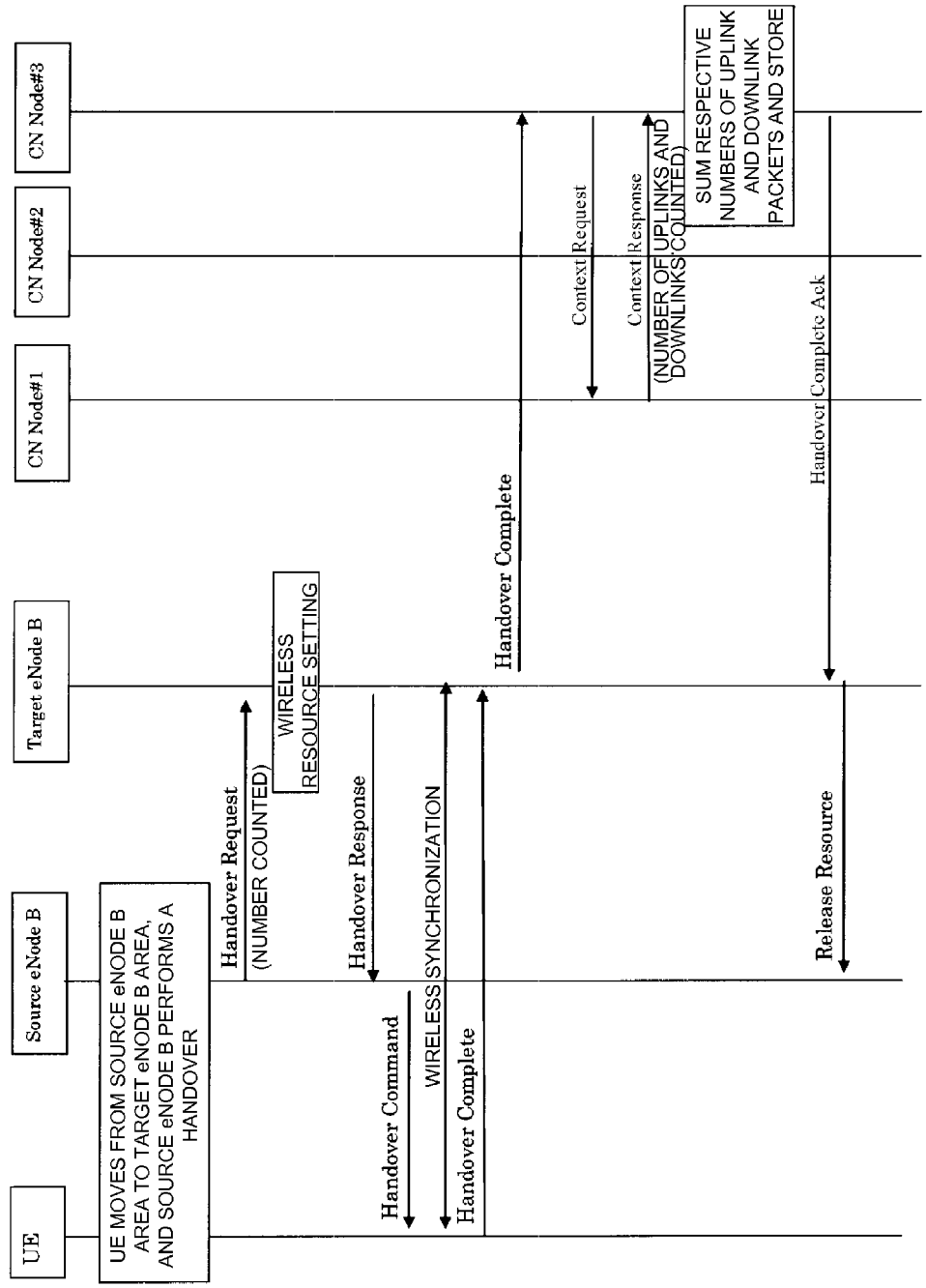
FIG. 6 is a sequence chart showing a procedure of transferring count information between CN Nodes according to a fifth exemplary embodiment of the present invention.
Figure 7:
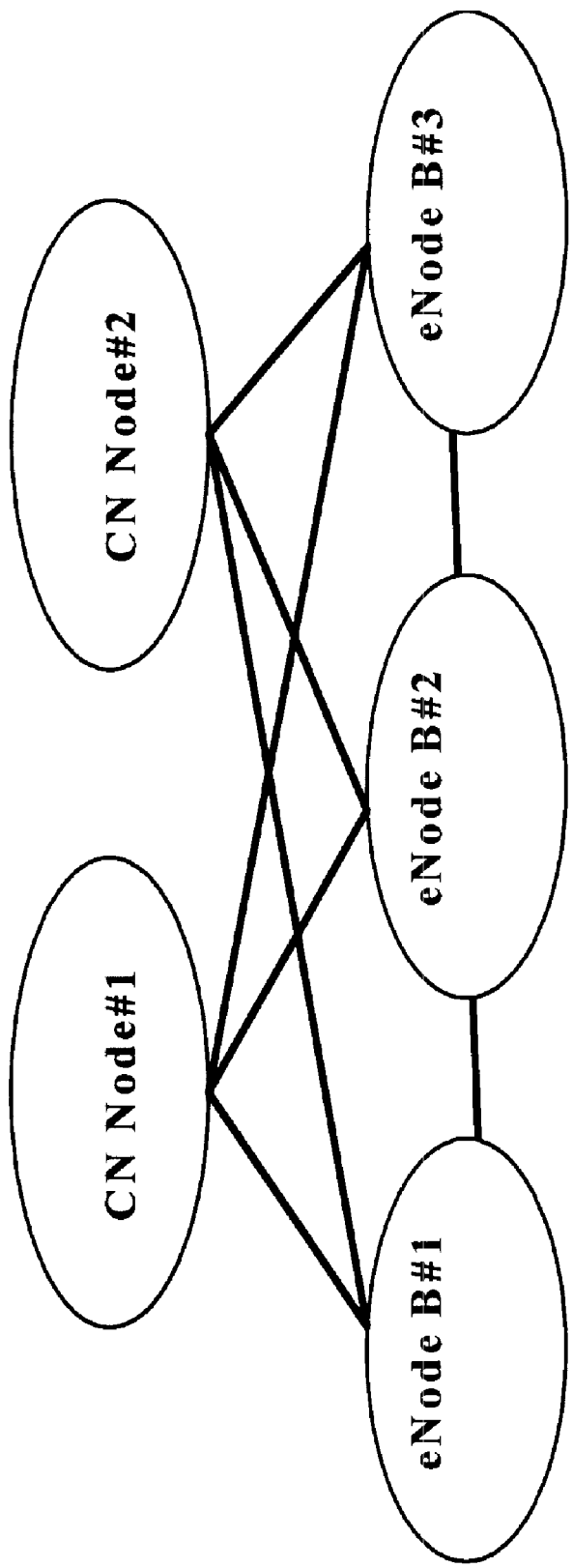
FIG. 7 is a drawing showing a conventional LTE network configuration.
Figure 8:
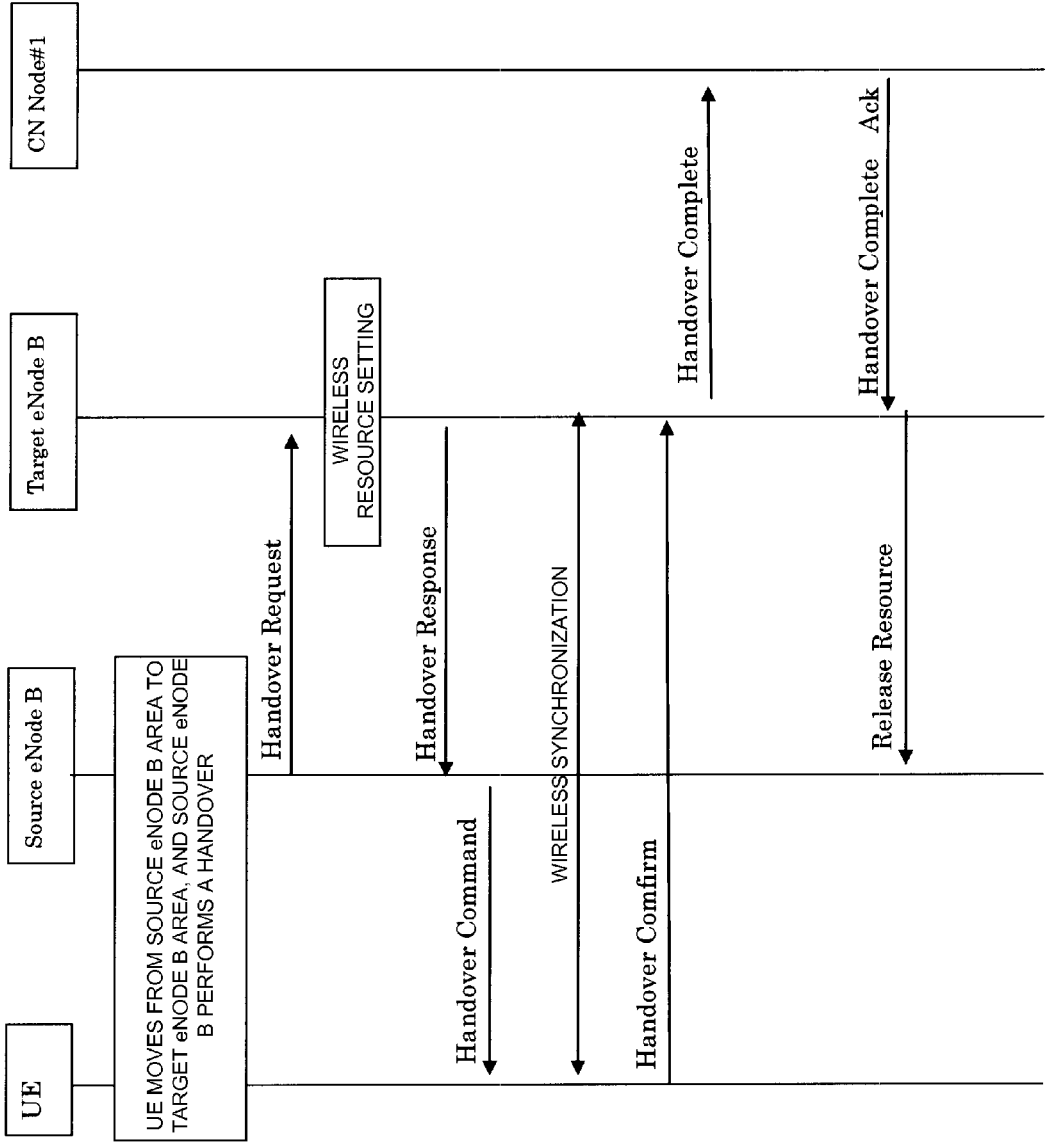
FIG. 8 is a sequence chart showing a conventional handover procedure.
Figure 9:
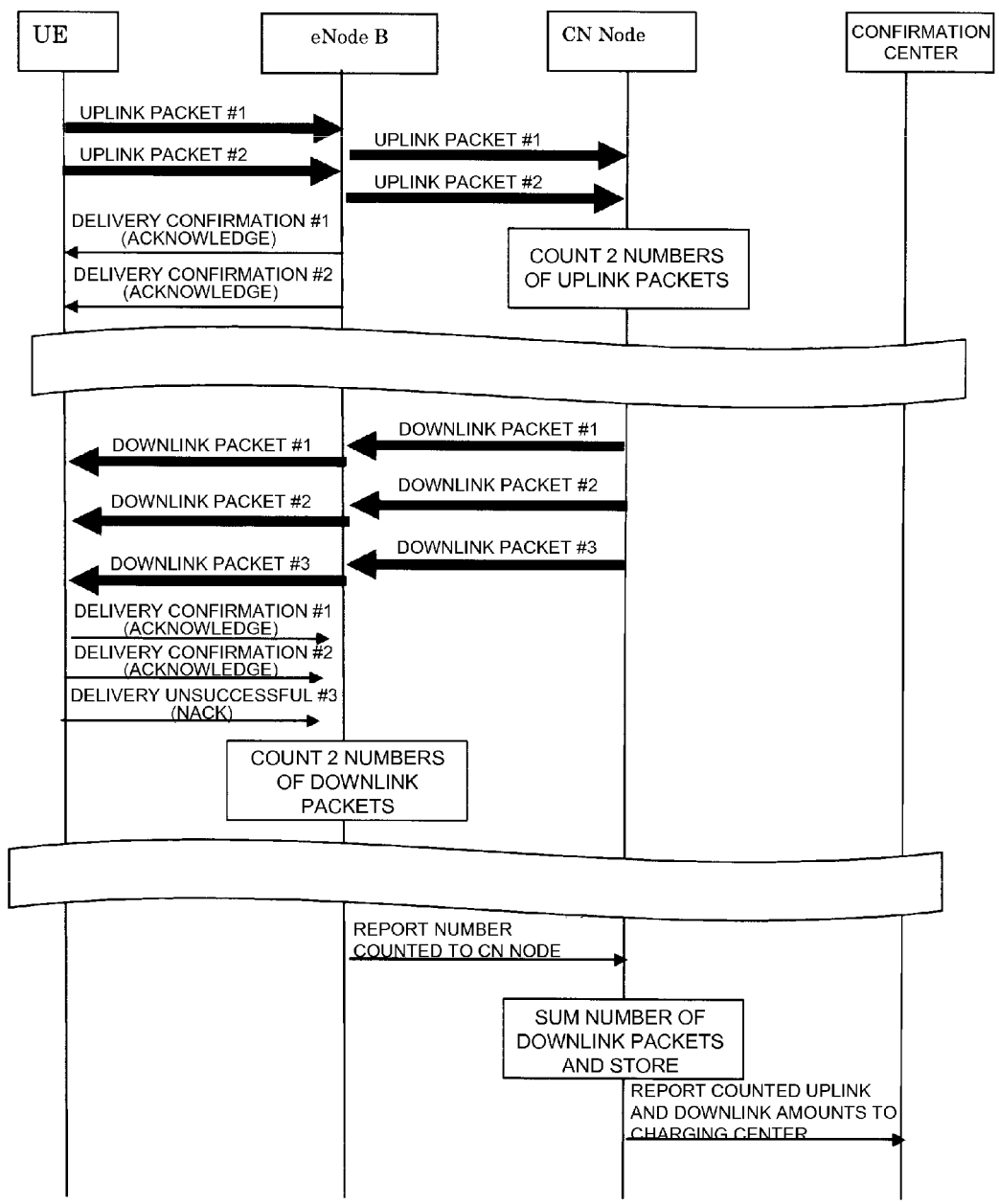
FIG. 9 is a sequence chart showing a conventional procedure of counting the number of packets and reporting.
Figure 10:
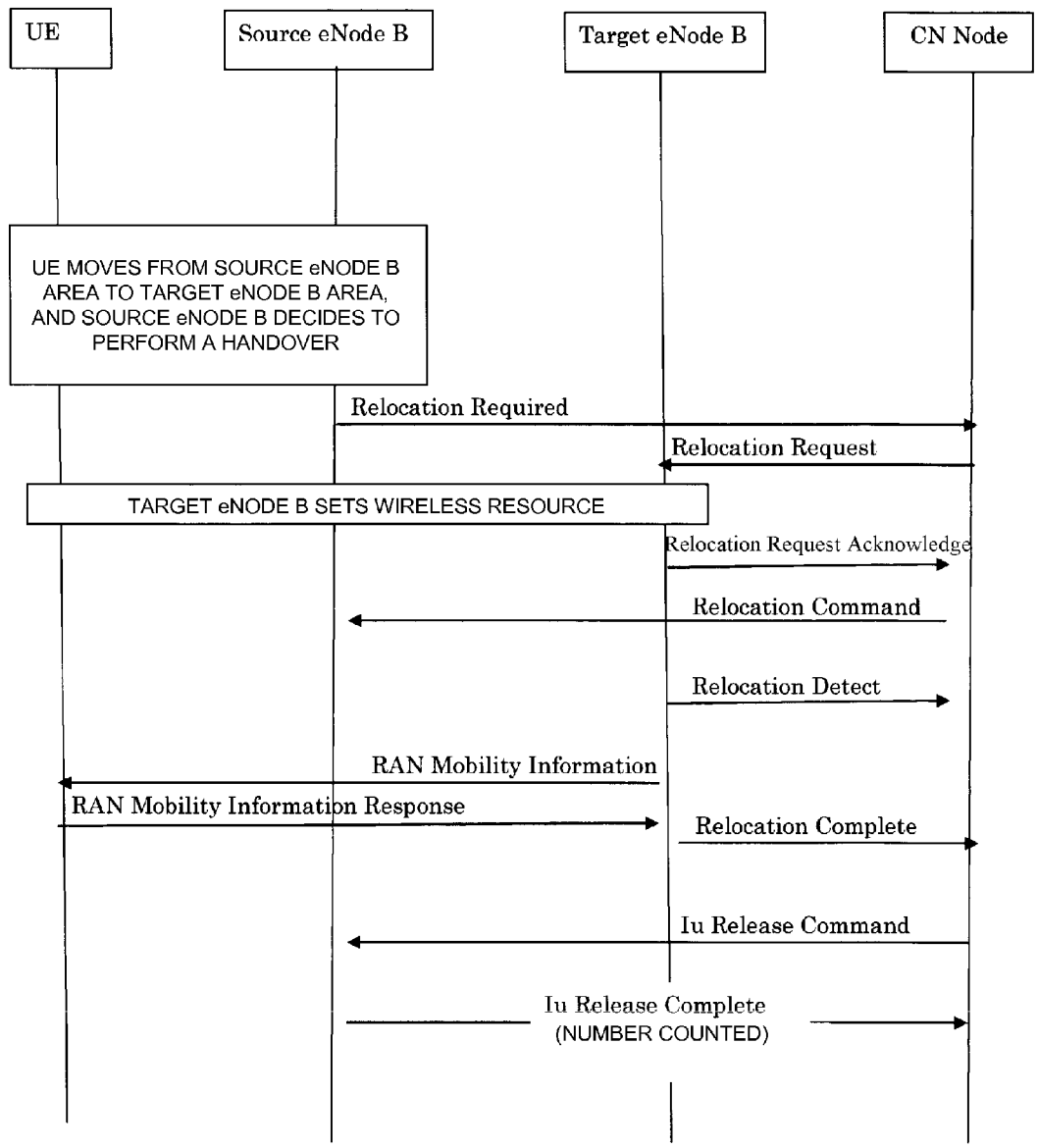
FIG. 10 is a sequence chart showing a procedure of reporting the number of packets counted at a mobile source eNode B in a conventional handover method.

FIG. 6 is a sequence chart showing a procedure of transferring count information between CN Nodes according to a fifth exemplary embodiment of the present invention. With an LTE architecture as shown in FIG. 6, an eNode B of a UE mobile source may change CN Node, according to handover.

For example, in a case where distance between an eNode B of a mobile target and a CN Node before moving is far, the eNode of the mobile target switches to a CN Node at a closer distance. Describing this specifically, in FIG. 6, with the UE communicating with eNode B #1 and the CN Node #1, the UE moves to the eNode B #2, due to a handover, but since the eNode B #2 and the CN Node #1 are at a distance that does not yet cause a problem, the CN Node #1 does not change.

Thereafter, the UE moves further to the eNode B #3, but since the distance between the eNode B #3 and the CN Node #1 becomes large, the eNode B #3 switches to the CN Node #3. By the CN Node switching according to this handover, for example, there is an effect related to shortening of transmission delay.

Since, in the switching of CN Node according to the handover, a switching target CN Node does not have information on the number of packets communicated by the UE up until this, when communication of the UE is ended later, it is not possible to report accurate information, when reporting to the charging center.

In order to eliminate this problem, in the present exemplary embodiment, as shown in FIG. 6, Context information on the UE is requested of the switching source CN Node #1 from the switching target CN Node #3 by a Context Request message, but the switching source CN Node #1 includes information on the number of uplink and downlink packets summed up until then, in the Context Response message, so as to notify the switching target CN Node #3.

When the UE later ends communication, the CN Node #3, as shown in FIG. 2, reports the number of packets counted, that have been received up until then, to the charging center.

In this way, in the present exemplary embodiment, even when the CN Node is switched according to the handover, by notifying information on the number of packets counted up until then, from the switching source CN Node to the switching target CN Node, since it is possible to report information on the number of packets communicated by the UE to the charging center, it is possible to have accurate charging.

The above operations are executed by a computer readable program, and clearly the base stations (first and second) and the communication terminals are provided with storage devices for storing the program and communication data.

Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention.

In the present invention, there are further possible modes as follows.

(Mode II-1) A communication method of a wireless communication system having a first base station, a second base station, and a wireless terminal, the method comprises: a process of the wireless terminal performing a handover from the first base station to a second base station; a process of the first base station transmitting information related to data volume of downlink data to the second base station, when the handover is performed; and a process of the second base station receiving information related to the data volume.

(Mode II-2) In the communication method according to Mode II-1, the first base station transmits information related to the data volume by a message requesting a handover.

(Mode II-3) In the communication method according to Mode II-1 or II-2, the second base station transmits information related to the data volume by a message completing a handover to a core network.

(Mode II-4) In communication method according to any one of Modes II-1 to II-3, the first base station includes information related to the data volume in a message indicating completion of the resource release, before a handover, and transmits to the second base station.

(Mode II-5) In the communication method according to Mode II-1, after communication between the first base station and the wireless terminal is completed, information related to the data volume is transmitted in a message indicating completion of resource release to a core network.

(Mode II-6) In the communication method according to Mode II-1, the second base station transmits information related to the data volume in a message reporting handover completion to a core network.

(Mode II-7) In the communication method according to Mode II-1, after transmission of a message requesting context information of a UE, to a first core network communicating with the first base station, from a second core network communicating with the second base station, the first core network includes information related to data volume of uplink and downlink data summed up until then, as information related to the data volume, in a message responding to a message requesting context information of a UE, and transmits to the second core network.

The invention claimed is:

1. A base station for communicating with a wireless terminal, the base station comprising:
a transmitter which is configured to transmit to a second base station information that indicates unsuccessfully transmitted downlink data volume, if the wireless terminal performs a handover from the base station to the second base station,
wherein the second base station accumulates the information indicating a data volume for a report on a resource release, and transmits a total amount of the data volume to a core network, when the second base station receives, from the core network, a request message related to the resource release.

2. The base station according to claim 1, wherein the transmitter transmits the information by a message relating to committing the handover.

3. A wireless terminal, comprising:
hardware;
means implemented at least by the hardware for communicating with a first base station; and
means implemented at least by the hardware for performing a handover from the first base station to a second base station, wherein the first base station comprises:
a transmitter which is configured to transmit to the second base station information that indicates unsuccessfully transmitted downlink data volume, if the wireless terminal performs the handover from the first base station to the second base station,
wherein the second base station accumulates the information indicating a data volume for a report on a resource release, and transmits a total amount of the data volume to a core network, when the second base station receives, from the core network, a request message related to the resource release.

4. The wireless terminal according to claim 3, wherein the transmitter transmits the information by a message relating to committing the handover.

5. A wireless communication system, comprising:
a first base station;
a second base station; and
a wireless terminal, wherein
the first base station communicates with the wireless terminal, and
the first base station comprises a transmitter which is configured to transmit to the second base station information that indicates unsuccessfully transmitted downlink data volume, if the wireless terminal performs a handover from the first base station to the second base station,
wherein the second base station accumulates the information indicating a data volume for a report on a resource release, and transmits a total amount of the data volume to a core network, when the second base station receives, from the core network, a request message related to the resource release.

6. The wireless communication system according to claim 5, wherein the transmitter transmits the information by a message relating to committing the handover.

7. A base station for communicating with a wireless terminal, the base station comprising:
a receiver for receiving from a second base station information that indicates unsuccessfully transmitted downlink data volume, if the wireless terminal performs a handover from the second base station to the base station,
wherein the base station accumulates the information indicating a data volume for a report on a resource release, and transmits a total amount of the data volume to a core network, when the base station receives, from the core network, a request message related to the resource release.

8. The base station according to claim 7, wherein the receiver receives the information by a message relating to committing the handover.

\* \* \* \* \*